United States Patent
Henry et al.

(10) Patent No.: US 12,113,961 B2
(45) Date of Patent: Oct. 8, 2024

(54) METHOD FOR ENCODING AND DECODING AN IMAGE OF A VIDEO SEQUENCE, AND ASSOCIATED DEVICE

(71) Applicant: FONDATION B-COM, Cesson-Sevigne (FR)

(72) Inventors: Félix Henry, Saint Gregoire (FR); Gordon Clare, Pacé (FR)

(73) Assignee: FONDATION B-COM, Cesson-Sevigne (FR)

(*) Notice: Subject to any disclaimer, the term of this patent is extended or adjusted under 35 U.S.C. 154(b) by 40 days.

(21) Appl. No.: 17/622,094

(22) PCT Filed: Jun. 24, 2020

(86) PCT No.: PCT/EP2020/067741
§ 371 (c)(1),
(2) Date: Dec. 22, 2021

(87) PCT Pub. No.: WO2020/260412
PCT Pub. Date: Dec. 30, 2020

(65) Prior Publication Data
US 2022/0368889 A1    Nov. 17, 2022

(30) Foreign Application Priority Data
Jun. 25, 2019  (FR) ...................... 1906871

(51) Int. Cl.
*H04N 19/105*    (2014.01)
*H04N 19/176*    (2014.01)
(Continued)

(52) U.S. Cl.
CPC ......... *H04N 19/105* (2014.11); *H04N 19/176* (2014.11); *H04N 19/186* (2014.11); *H04N 19/46* (2014.11)

(58) Field of Classification Search
CPC .... H04N 19/46; H04N 19/186; H04N 19/176; H04N 19/105
See application file for complete search history.

(56) References Cited

U.S. PATENT DOCUMENTS

2016/0100175 A1    4/2016  Laroche et al.
2019/0007706 A1    1/2019  Henry
(Continued)

FOREIGN PATENT DOCUMENTS

| CN | 108781292 A | 11/2018 |
| CN | 109076210 A | 12/2018 |
| CN | 109417618 A |  3/2019 |
| WO | 2020219733 A1 | 10/2020 |

OTHER PUBLICATIONS

International Search Report for PCT/EP2020/067741 mailed Sep. 7, 2020, 3 pages.
(Continued)

*Primary Examiner* — On S Mung
(74) *Attorney, Agent, or Firm* — NIXON & VANDERHYE

(57) ABSTRACT

Proposed is a method for encoding an image of a video sequence, the image including at least two components, including a component representative of the luminance and a component representative of the chrominance, each component being partitioned into blocks, wherein the method involves encoding at least one block of the chrominance component using a BDPCM mode.

17 Claims, 7 Drawing Sheets

(51) Int. Cl.
*H04N 19/186* (2014.01)
*H04N 19/46* (2014.01)

(56) References Cited

U.S. PATENT DOCUMENTS

| | | |
|---|---|---|
| 2019/0174138 A1 | 6/2019 | Jung |
| 2019/0222859 A1 | 7/2019 | Chuang |
| 2021/0385442 A1 | 12/2021 | Zhu |
| 2021/0385459 A1 | 12/2021 | Zhu |
| 2022/0385916 A1 | 12/2022 | Zhu |

OTHER PUBLICATIONS

Written Opinion of the ISA for PCT/EP2020/067741 mailed Sep. 7, 2020, 14 pages.

Nam et al., "Lossless video coding based on pixel-wise prediction", Multimedia Systems, Springer, Berlin, DE, vol. 14, No. 5, Sep. 17, 2008, pp. 291-298.

Karczewicz et al., "CE8-related: Quantized residual BDPCM" Mar. 13, 2019, 14. JVET Meeting; Mar. 19, 2019-Mar. 27, 2019, Geneva, (The Joint Video Exploration Team Of ISO/IEC JTC1/SC29/WG11 and ITU-T SG. 16), 5 pages.

Henry et al. "CE8: BDPCM with horizontal/vertical predictor and independently decodable areas (test 8.3.1b)", Jan. 10, 2019, 125 MPEG Meeting; Jan. 14, 2019-Jan. 18, 2019, Marrakech, 7 pages.

Wein, "High Efficiency Video Coding, Signals and Communication Technology", chapter 6, Inter Prediction, sourcing@b-com.com, pp. 161-177.

Wien, "High Efficiency Video Coding, Signals and Communication Technology", chapter 7, Inter Prediction, sourcing@b-com.com, pp. 179-203.

Office Action, issued in Chinese Patent Application No. 202080046806.8 dated Dec. 29, 2023.

Office Action, issued in Japanese Patent Application No. 2021-577329 dated Jun. 4, 2024.

METHOD FOR ENCODING AND DECODING AN IMAGE OF A VIDEO SEQUENCE, AND ASSOCIATED DEVICE

This application is the U.S. national phase of International Application No. PCT/EP2020/067741 filed Jun. 24, 2020 which designated the U.S. and claims priority to FR Patent Application No. 1906871 filed Jun. 25, 2019, the entire contents of each of which are hereby incorporated by reference.

BACKGROUND OF THE INVENTION

Field of the Invention

The present invention generally relates to the technical field of video compression.

More particularly, it relates to a method for encoding and decoding an image of a video sequence, and an associated device.

Description of the Related Art

Video compression standards such as HEVC ("High Efficiency Video Coding", described for example in "High Efficiency Video Coding, Coding Tools and Specification", Matthias Wien, Signals and Communication Technology, 2015) and post-HEVC standards describe a step of predicting a part of the image to be encoded from a reference image. This one can be located in the same image as the considered area (INTRA prediction mode) or in another image of the video sequence (INTER prediction mode).

A block elements prediction mode, called BDPCM (for "Block Differential Pulse Code Modulation"), comprises predicting the value of an image pixel based on the value(s) of one or several of its neighbours. Different alternatives of this mode exist. A first alternative is based on the prediction of a quantized residual as described in "CE8-related: Quantized residual BDPCM, Marta Karczewicz, Video Experts Team (JVET) of ITU-T SG 16 WP 3 and ISO/IEC JTC 1/SC 29/WG 11, 14th Meeting: Geneva, CH, 19-27 Mar. 2019". A second alternative is based on the values of reconstructed pixels, located in the vicinity of the considered area, as described in "CE8: BDPCM with horizontal/vertical predictor and independently decodable areas (test 8.3.1b), Mohsen Abdoli, Gordon Clare, Félix Henry, Pierrick Philippe, Joint Video Experts Team (JVET) of ITU-T SG 16 WP 3 and ISO/IEC JTC 1/SC 29/WG 11, 13th Meeting: Marrakech, MA, 9-18 Jan. 2019".

SUMMARY OF THE INVENTION

In this context, the invention proposes a method for encoding an image of a video sequence, the image comprising at least two components, including a component representative of the luminance and a component representative of the chrominance, each component being partitioned into blocks, wherein the method includes encoding at least one block of the chrominance component, using a so-called BDPCM mode.

Using the BDPCM mode for encoding a block of the chrominance component makes it possible to improve the image compression gain.

Other non-limitative and advantageous features of the method according to the invention, taken individually or according to all the technically possible combinations, are the following.

According to an embodiment, at least one block of the chrominance component can be encoded using the BDPCM mode when a predetermined criterion is met.

It is therefore possible to choose the chrominance components to which the BDPCM mode is applied, for example when these ones meet a predetermined criterion.

For example, the predetermined criterion is met when said two components are of identical size.

The criterion can also be an encoding criterion indicative of a choice operated by an encoder adapted to implement the encoding method. This choice operated by the encoder results, for example, from an analysis of the video sequence. The choice of the encoder can thus depend on an histogram, in other words a statistical graph, representing the pixel intensity distribution in one or several images of the video sequence, i.e. the number of pixels for each light intensity.

According to an embodiment, the encoding can further comprise encoding information indicative of the BDPCM mode used for encoding the block of the chrominance component.

According to an embodiment, when the predetermined criterion is met, an indicator, signalling the use of the BDPCM mode, is encoded for the block of the chrominance component.

According to another aspect, the invention also proposes a method for encoding an image of a video sequence, the image comprising at least two components, including a component representative of the luminance and a component representative of the chrominance, each component being partitioned into blocks, wherein the method comprises, for at least one block of the chrominance component, evaluating a so-called BDPCM mode and another mode for encoding said block and, as a function of the evaluation outcome, selecting one of the modes for encoding said block, and encoding information representative of the mode selected for encoding said block.

Evaluating the BDPCM mode for at least one block of the chrominance component makes it possible to apply the BDPCM mode if the evaluation outcome is satisfying. The image compression gain is thus improved. The chrominance components for which it is not relevant to apply the BDPCM mode can hence be set aside if the evaluation does not give a satisfying outcome.

According to an embodiment, the BDPCM mode and the other mode can be evaluated for at least one block of the chrominance component when a predetermined criterion is met.

According to an embodiment, the predetermined criterion can be met when said two components are of identical size.

According to an embodiment, the encoding can further comprise encoding information signalling the image sampling format, said information being indicative of the sizes of said components.

According to an embodiment, the evaluation can comprise encoding the considered block of the chrominance component, on the one hand, according to the BDPCM mode and, on the other hand, according to the other mode, and as a function of another predetermined criterion (for example, a rate-distortion cost), selecting the block encoded according to the BDPCM mode or the block encoded according to the other mode.

According to an embodiment, the method can further comprise, for at least one block of the luminance component, evaluating the so-called BDPCM mode and the other mode for encoding said block of the luminance component and, as a function of the evaluation outcome, encoding information representative of one of the modes for encoding said block of the luminance component.

According to an embodiment, the components have preferably the same block partitioning, the image encoding being made block by block.

As an alternative, the image encoding can be made component by component.

According to an embodiment, the encoding can further comprise, for the considered image, encoding first information relating to at least said image, indicating that the BDPCM mode can be used for encoding at least one block of at least one component of the image, and if the first information indicates that the BDPCM mode can be used for encoding at least one block of at least one component of the image, encoding second information relating to at least said image, indicating that the BDPCM mode can be used for encoding at least one block of the chrominance component of the image.

According to an embodiment, the method can comprise, for at least one block of the chrominance component, if the second information relating to said image indicates that the BDPCM mode can be used for encoding at least one block of the image chrominance component, encoding an indicator relating to at least one block of the chrominance component, indicating that the BDPCM mode is used for encoding said block of the chrominance component.

According to an embodiment, the method can comprise, for at least one block of the chrominance component, if the criterion is met, encoding an indicator relating to said block, indicating that the BDPCM mode is used for encoding said block of the chrominance component.

According to an embodiment, the image further comprises a second chrominance component having the same partitioning as the other chrominance component and, if the BDPCM mode is selected for the block of the other chrominance component, said information relating to the block of the other chrominance component can comprise an indicator indicating that the BDPCM mode is selected for the block of the other chrominance component and the corresponding block of the second chrominance component, and a direction indicator, for determining a block predictor for the block of the other chrominance component and the corresponding block of the second chrominance component.

According to an embodiment, a block is formed of elements, the encoding of a block using the BDPCM mode can comprise, for at least one element of the block, encoding a quantized value of a residual, representative of a difference between a first and a second value, the first value corresponding to a quantized value of a difference between the value of the considered element and a reference element whose position is signalled by the given direction, and the second value corresponding to the quantized value of a difference between said other element and another reference element signalled by the given direction.

According to another aspect, the invention also proposes a method for encoding an image of a video sequence comprising at least two components, including a component representative of the luminance and a component representative of the chrominance, the luminance and chrominance components having the same block partitioning, wherein the method can comprise, for at least one block of the luminance component, evaluating a so-called BDPCM mode and another mode for encoding said block, and as a function of the evaluation outcome, selecting one of the modes for encoding said block of the luminance component and the corresponding block of the chrominance component, and encoding information representative of the mode selected for encoding the block of the luminance component and the corresponding block of the chrominance component.

Preferably, if the BDPCM mode is selected, said information relates to the block of the luminance component, and comprises an indicator indicating that the mode selected for the block of the luminance component and for the corresponding block of the chrominance component is the BDPCM mode and a direction indicator for determining a block predictor for the block of the luminance component and for the corresponding block of the chrominance component.

According to another aspect, the invention also proposes a method for decoding an encoded image, from a stream of encoded video data, the image comprising at least two components, including a component representative of the luminance and a component representative of the chrominance, each component being partitioned into blocks, wherein the method comprises decoding information indicating, for at least one block of the chrominance component, whether it is encoded or not using a so-called BDPCM mode.

When the image further comprises a second chrominance component having the same partitioning as said chrominance component (or "first" chrominance component), the value decoded from said information can also be used for indicating if the corresponding block of the second chrominance component is encoded using a so-called BDPCM mode.

Said decoded value from said information can also indicate a direction allowing, from respective block predictors, function of said direction, decoding the block of said (first) chrominance component and the corresponding block of the second chrominance component.

According to another aspect, the invention also proposes a method for decoding an encoded image, from a stream of encoded video data, the image comprising at least two components, including a component representative of the luminance and a component representative of the chrominance, each component being partitioned into blocks, wherein the method comprises decoding first information representative of an encoding criterion and, if the value decoded from the information indicates that the encoding criterion is met, decoding second information indicating, for at least one block of the chrominance component, whether it is encoded or not using a so-called BDPCM mode.

Preferably, for the last two above-mentioned aspects of the invention, the image can further comprise a second chrominance component having the same partitioning as the other chrominance component, and the value decoded from the second information is also used for indicating if the corresponding block of the second chrominance component is encoded using a so-called BDPCM mode, wherein said value decoded from the second information can also indicate a direction allowing, from respective block predictors, function of said direction, decoding the block of the other chrominance component and the corresponding block of the second chrominance component.

Preferably, the method can further comprise decoding other information indicating, for at least one block of the chrominance component, if it is encoded using a so-called BDPCM mode.

As already indicated, the encoding criterion can for example be indicative of a choice operated by an encoder having encoded said stream of video data. This choice operated by the encoder can result from an analysis of the stream of video data.

According to another aspect, the invention also proposes a method for decoding an encoded image, from a stream of encoded video data, the image comprising at least two components, including a component representative of the luminance and a component representative of the chrominance, each component being partitioned into blocks, wherein the method comprises decoding first information relating to at least said image, indicating that the BDPCM mode can be used for decoding at least one block of at least one component of the image, and if the first information indicates that the BDPCM mode can be used for decoding at least one block of at least one component of the image, decoding second information relating to at least said image, indicating that the BDPCM mode can be used for decoding at least one block of the chrominance component of the image.

The method can moreover comprise, if the second information relating to said image indicates that the BDPCM mode can be used for decoding at least one block of the image chrominance component, decoding an indicator relating to said at least one block of the chrominance component, indicating that the BDPCM mode can be used for decoding said block of the chrominance component.

According to another aspect, the invention also proposes a method for decoding an encoded image, from a stream of encoded video data, the image comprising at least two components, including a component representative of the luminance and a component representative of the chrominance having the same block partitioning, wherein the method comprises decoding first information representative of an encoding criterion and, if the value decoded from the information indicates that the encoding criterion is met, decoding second information relating to at least one block of the luminance component indicating whether the block of the luminance component and the corresponding block of the chrominance component are encoded or not using a so-called BDPCM mode.

According to another aspect, the invention also proposes a device for encoding an image of a video sequence, the image comprising at least two components, including a component representative of the luminance and a component representative of the chrominance, each component being partitioned into blocks, wherein the device comprises at least one microprocessor configured to implement a step of encoding at least one block of the chrominance component, using a so-called BDPCM mode.

According to another aspect, the invention also proposes a device for decoding an encoded image from a stream of encoded video data, the image comprising at least two components, including a component representative of the luminance and a component representative of the chrominance, each component being partitioned into blocks, wherein the device comprises at least one microprocessor configured to implement a step of decoding information indicating, for at least one block of the chrominance component, whether it is encoded or not using a so-called BDPCM mode.

BRIEF DESCRIPTION OF THE DRAWINGS

Moreover, various other features of the invention will appear from the appended description, made with reference to the drawings that illustrate non-limitative embodiments of the invention, and wherein.

DESCRIPTION OF THE PREFERRED EMBODIMENTS

Figure 1:
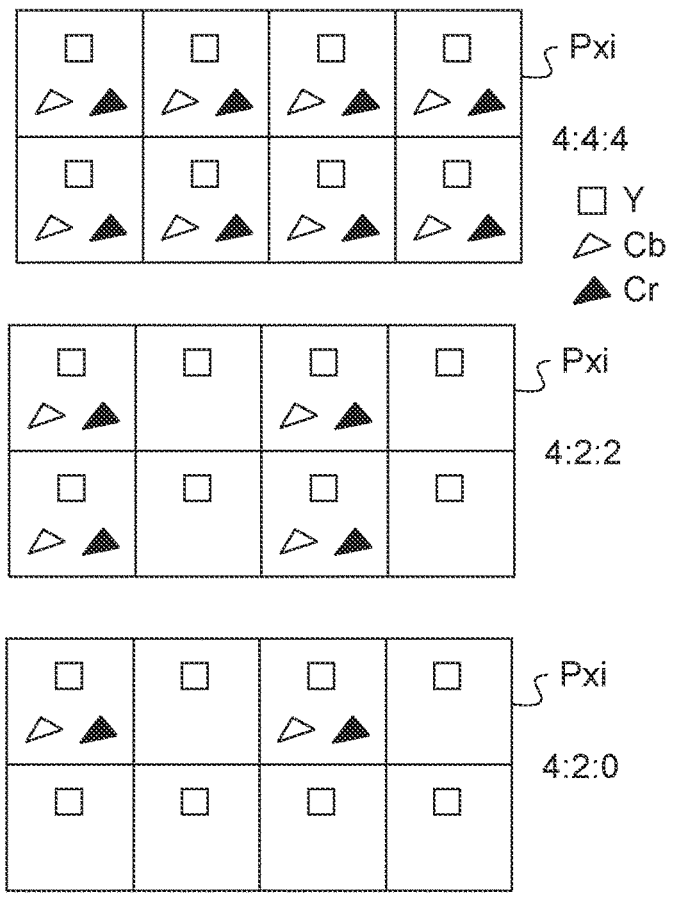
FIG. 1 illustrates different color formats.

FIG. 1 illustrates, for a given color standard (for example, the "YUV" or "YCbCr" standard), different sampling patterns liable to be applied to the components representative of the chrominance of an image. Conventionally, an image includes a component representative of the luminance, here denoted Y (called hereafter "luminance component" or "luma" for the sake of simplification), and two chrominance components (called hereafter "chrominance component" or "chroma" for the sake of simplification). These latter are denoted Cb and Cr, respectively, in FIG. 1.

FIG. 1 illustrates three formats, each associated with a sampling pattern, for an image area consisted of 8 pixels Pxi, forming two blocks of 2 pixels by 2 pixels. Human vision being less sensitive to color than to brightness, less chrominance information than luminance information is generally retained without degrading that way the perceived quality of the image.

In the so-called 4:4:4 first format or first structure, none of the component is subsampled. Each pixel Pxi comprises three color components.

In the so-called 4:2:2 second format, the chrominance components are subsampled for every other pixel.

In the so-called 4:2:0 third format, only the chrominance components of the first pixel of a block formed of four pixels (2 pixels*2 pixels) are kept.

Other formats exist, the examples given hereinabove being not exhaustive.

Figure 2:
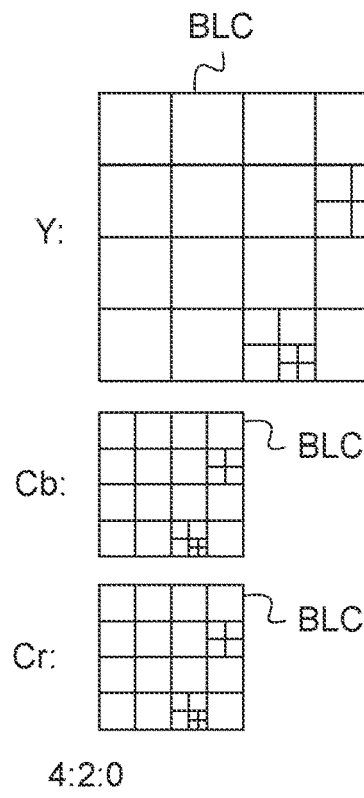
FIG. 2 illustrates different color components according to a given color format.

Thus, as illustrated in FIG. 2 for the 4:2:0 format, when a chrominance component Cb, Cr is subsampled, its size is lower than that of the luminance component Y. For example, for the 4:2:0 format, the size of the chrominance components Cb and Cr is divided by 4 with respect to the luminance size.

Each component is partitioned into blocks BLC. The block partitioning can be identical for each of the components as illustrated in FIG. 2 or particular for one or a set of components.

Figure 3:
FIG. 3 shows a first embodiment of an encoding method according to the invention.

In a first embodiment illustrated in FIG. 3, it is proposed to encode, in a step E1, at least one block of the chrominance component according to a so-called BDPCM ("Block Differential Pulse Code Modulation") mode, in particular when a predetermined criterion CT is met.

As an alternative, the BDPCM mode can for example be applied by default.

Applying the BDPCM mode to the chrominance allows improving the data compression rate. It is possible to apply this mode when a certain criterion is met, in such a way as, for example, not to increase the complexity of the encoding method. Different possible criteria are described hereinafter.

These so-called encoding criteria are not linked to the quality of the compression itself, but to a decision of the encoder to use or not a tool based on considerations such as: encoding time, relevance of the tool in question for the type of content to be encoded, energy consumption, or aimed data rate (this list being not exhaustive).

In other words, an encoding criterion is a general choice of the encoder, with respect to an encoding context liable to change from one content to another or with respect to an aimed performance. It is thus different from a criterion that is only based on local information specific to a considered block or that results from a choice of implementation made by a user.

As exposed hereinabove, several alternatives of the BDPCM mode exist.

In a first alternative (called R-BDPCM) described in the above-mentioned article "CE8-related: Quantized residual BDPCM", when the luminance component of a block is encoded according to the BDPCM mode, direction information (for example, an indicator) is encoded for the considered luminance block. The indicator is representative of a vertical or horizontal direction.

In this first alternative, a prediction of the INTRA type is firstly made on the elements of the considered block. This prediction is identical to that described in the HEVC standard. Thus, if the direction indicator for the block corresponds to a horizontal direction, the horizontal INTRA prediction is applied, that is to say that the value of the element of the considered block (or of one of its components) is predicted from the value of the neighbour element, on the left of this element. Otherwise, the vertical INTRA prediction is applied, that is to say that the value of the element of the considered block (or of one of its components) is predicted from the value of the neighbour element, above of this element. The value of the element of the luminance component of the considered predicted block, located on line i and column j of the block, is denoted P(i,j), the elements of one block being organized into lines and columns (i and j being integers).

Secondly, the prediction residual RES1 of each element P(i,j) is calculated as follows:

$$RES1(i,j)=P(i,j)-PRED1(i,j)$$

where PRED1(i,j) is a predictor equal to the element on the left of P(i,j), REFLEFT(i,j), if the defined prediction direction is horizontal, or to the element above P(i,j), REFTOP(ij), if the defined prediction direction is vertical.

Then, the calculated prediction residual RES1(i,j) is quantized into a quantized residual denoted QRES1 (i,j) for the element P(i,j).

If the previous INTRA prediction has been made in the horizontal direction, so-called residual values R(i,j) are obtained as follows:

$$R(i,0)=QRES1(i,0)$$

$$R(i,j)=QRES1(i,j)-QRES1(i,j-1) \text{ for } j \neq 0.$$

If the previous INTRA prediction has been made in the vertical direction, the values R(i,j) are produced as follows:

$$R(0,j)=QRES1(0,j)$$

$$R(i,j)=QRES1(i,j)-QRES1(i-1,j) \text{ for } i \neq 0.$$

Thereafter, all the values R(i,j) are encoded by known means, such as encoding of the residual coefficients of the HEVC standard, for example.

During the decoding of the encoded data stream, if the prediction direction, transmitted in the stream, is horizontal, the quantized residual QRES1(i,j) is reconstructed as follows:

$$QRES1(i,j)=\Sigma^{j}_{k=0}R(i,k).$$

During the decoding, if the prediction direction is vertical, the quantized residual QRES1(i,j) is reconstructed as follows:

$$QRES1(i,j)=\Sigma^{i}_{k=0}R(k,j).$$

The reconstructed version REC1(i,j) of pixel P(i,j) can then be reconstructed, from the prediction direction and the quantized residual QRES1(i,j), by adding to the predictor PRED1(i,j), the dequantized value of QRES1(i,j).

In a second alternative (called S-BDPCM) described in the above-mentioned article "CE8: BDPCM with horizontal/vertical predictor and independently decodable areas (test 8.3.1b)", direction information (for example, an indicator) is also encoded for the luminance component in the considered block. Likewise, the indicator is representative of a vertical or horizontal direction.

In this alternative, the elements are processed one after the other, in a defined order. If the direction indicator corresponds to the horizontal prediction direction, all the elements of the first column of the block (on the left) are first processed, then all the samples of the second column, and so on until the last column of the block. Within one column, the elements can be processed in parallel or in an indifferent order. A reference element called predictor element, PRED2 (i,j), allows predicting the element of the considered block located on the $i^{th}$ line of the $j^{th}$ column. We obtain:

$$PRED2(i,0)=REFLEFT(i)$$

$$PRED2(i,j)=REC2(i,j-1) \text{ for } j \neq 0, \text{ where}$$

REFLEFT(i) is the reference element (i.e. belonging to the decoded neighbour block) on the left of the block and on the $i^{th}$ line, and REC2(i,j−1) is the reconstructed element of the considered block located on the $i^{th}$ line and the $(j-1)^{th}$ column (i.e. on the immediate left of the considered element).

If the direction indicator corresponds to the vertical prediction direction, all the elements of the first line of the block (at the top) are processed, then all the samples of the second line, and so on until the last line. Within a same line, the elements can be processed in parallel or in an indifferent order. Likewise, a reference element called predictor element, PRED2(i,j), for predicting the element located on the $i^{th}$ line of the $j^{th}$ column of the considered block, is obtained as follows:

$$PRED2(0,j)=REFTOP(j)$$

$$PRED2(i,j)=REC2(i-1,j) \text{ for } i \neq 0, \text{ where}$$

REFTOP(i) is the reference element (i.e. belonging to the decoded neighbour block) above the considered block and on the $j^{th}$ column;

REC2(i−1,j) is the decoded (or reconstructed) element of the considered block located on the $(i-1)^{th}$ line and the $j^{th}$ column (hence, immediately above the current element).

A corresponding residual RES2(i,j) is then calculated by difference between the original value of the element located on the $i^{th}$ line of the $j^{th}$ column of the considered block and PRED(i,j).

The residual RES2(i,j) is quantized in such a way as to obtain a quantized residual: QRES2(i,j).

During the decoding, the quantized residual obtained from an encoded video stream, transmitted to a decoder, is then dequantized to obtain a dequantized residual: DQRES2 (i,j).

The reconstructed value REC2(i,j) of the considered element is then obtained according to the following formula:

REC2(i,j)=PRED2(i,j)+DQRES2(i,j), PRED2(i,j). It is to be noted that REC2(i,j) is used for predicting the next element in the element processing order.

Let's note that, in the case where the quantization used in the above-mentioned alternatives is a uniform scalar quantization, the first and the second alternative are equivalent. Indeed, assuming that the prediction is horizontal (the reasoning is the same in case of vertical prediction) and that the uniform scalar quantization uses a quantization pitch δ. In this case, according to the first alternative, a reconstructed element REC1(i,j) is written:

$$REC1(i,j)=REFLEFT(i)+\Sigma^j_{k=0}QRES1(i,k)*\delta.$$

According to the second alternative, the reconstructed element REC2(i,j) is written:

$$\begin{aligned} REC2(i,j) &= PRED2(i,j) + DQRES2(i,j) \\ &= REC2(i, j-1) + QRES2(i,j)*\delta \\ &= REC2(i, j-2) + (QRES2(i, j-1) + QRES2(i,j))*\delta \\ &\ldots \\ &= REFLEFT(i) + \sum^j_{k=0} QRES2(i,j)*\delta \end{aligned}$$

Thus, in both cases, the reconstructed element is equal to the value of the reference element REFLEFT(i), to which is added the sum of the quantized residual values of the previously reconstructed elements, multiplied by the quantization pitch. Hereinafter, the word BDPCM will be used for denoting indifferently one or the other of the alternatives.

The predetermined criterion CT to be met can relate to the image color format. For example, when the image or several images or all the images of the video sequence are not subsampled, the encoding of at least one block of the chrominance component(s) of one or several images is made using the BDPCM mode. Another predetermined criterion CT can be function of the overall content of one or several images or of the content of one of its components. The overall content can be analysed by the encoder, using an histogram, for example. As a function of the analysis result, the encoder choses whether to implement or not an encoding mode. For example, if an image or a component of the image includes images of a certain format such as "Screen Content", the encoding of at least one block of the image chrominance component(s) is made using the BDPCM mode. Another predetermined criterion can be the gain produced if the BDPCM mode is used for encoding the block of the chrominance component, i.e. whether this gain is higher or not than a predetermined threshold. The list of criteria mentioned hereinabove is not exhaustive. The person skilled in the art may use another criterion, not mentioned here, that involves, when met, the encoding of at least one block of a chrominance component of an image.

Figure 4:
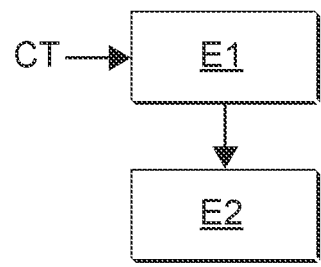
FIG. 4 shows a second embodiment of an encoding method according to the invention.

FIG. 4 illustrates another embodiment of the invention, comprising, in addition to step E1, a step E2 of encoding information indicative of the BDPCM mode used for encoding the block of the chrominance component.

This information can be a binary indicator at the block level (i.e. relating to the considered block) that, when activated for a block of the chrominance component, indicates that the BDPCM mode is used for encoding the block in question.

Moreover, the information relating to a block of a chrominance component can also be valid for the corresponding block of the other chrominance component, if both chrominance components have the same block partitioning. A single indicator is signalled at the level of the block of the first chrominance component. In other words, a single indicator indicates if the BDPCM mode is used for encoding, on the one hand, a block of a (first) chrominance component and, on the other hand, the corresponding block in the other (or second) chrominance component.

Preferably, said information can further be indicative of a prediction direction, vertical or horizontal, as explained hereinabove. As for the previous indicator, the direction information can be a binary indicator signalled only for the block of the first chrominance component and also valid for the corresponding block of the second chrominance component.

Figure 5:
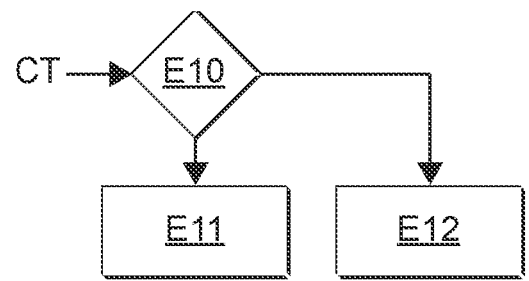
FIG. 5 shows a third embodiment of an encoding method according to the invention.

FIG. 5 illustrates another embodiment of the invention. This embodiment comprises a step E10 comprising, in particular if criterion CT is met, evaluating the BDPCM mode and another mode for encoding a block of the chrominance component. As an alternative, step E10 can be independent of criterion CT. In another alternative, if the partitioning of the luminance and chrominance components is identical, the evaluation can be made on the corresponding luminance block and the selected mode can then be directly used for encoding the chrominance component.

The other mode can for example be an encoding mode with only an INTRA prediction or an INTER prediction mode, as described for the HEVC standard. The evaluation here comprises encoding the chrominance component of the considered block according, on the one hand, to the BDPCM mode, and on the other hand, to the other mode. The block of the chrominance component encoded according to the BDPCM mode or to the other mode is selected as a function of another predetermined criterion. This other predetermined criterion can be, for example, the rate-distortion cost. If this cost is higher than a given threshold, in this case, the BDPCM mode is not used for encoding the chrominance component of the considered block.

Step E11 then comprises encoding information representative of the other encoding mode for the block of the chrominance component. Conversely, step E12 comprises encoding information representative of the BDPCM mode for encoding the block of the chrominance component.

Steps E11 and E12 can further comprise encoding information representative of criterion CT, if the latter is taken into account at the previous step. For example, if the criterion to be met is to have an identical size for the luminance and chrominance components, steps E11 and E12 can further comprise encoding information signalling the image sampling format. If this information indicates that the color format is 4:4:4, then criterion CT is met, because, in this format, the color components have the same size. For example, if the images of a video sequence can potentially be in format 4:4:4 or format 4:2:0, the information can then be a binary indicator that, when activated, signals that the image (or the sequence if it is used at the sequence level) is in format 4:4:4.

Figure 6:
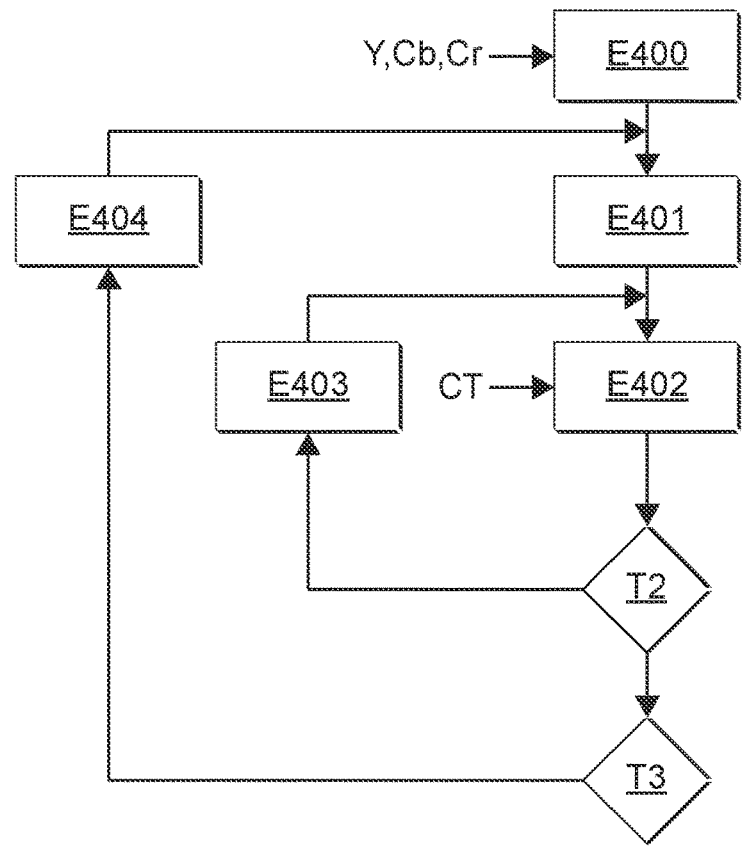
FIG. 6 shows a fourth embodiment of an encoding method according to the invention.

FIG. 6 illustrates an embodiment of encoding of several components of a block of the image. The encoding is here made component by component. All the blocks of a same component are encoded before encoding the blocks of another component. This embodiment is particularly adapted if the components have not the same partitioning.

In a first step E400, a first component is considered, for example the luminance component. Then, for this selected luminance component, the first block is considered, E401. This one is encoded according to a method chosen at step E402. For example, the method can comprise evaluating the BDPCM mode and another mode, then selecting the encoded block generating the lowest rate-distortion cost. During a test T2, it is checked that the encoded block is the last block of the component. If this is not the case, the next block is processed at step E403, until all the blocks of the luminance component are encoded.

If the processed component is not the last one, test T3, another component is obtained at step E404, for example the first chrominance component. Likewise, the first block of the new component is selected at step E401. Then, this block is encoded according to one of the methods described hereinabove. The encoding can here be function of a predetermined criterion CT. For example, the encoding of this chrominance component can comprise evaluating the BDPCM mode and another mode, if the color format of the image or of the complete video sequence is 4:4:4.

As an alternative, if the chrominance component and the luminance component have the same partitioning, the block of the chrominance component can be encoded using the mode selected for encoding the corresponding block of the luminance component. For example, if the mode selected for the block of the luminance component is the BDPCM mode, this one is used by default for encoding the corresponding block of the chrominance component.

As previously, if the processed block of the chrominance component is not the last one, test T2, the process continues to the next block E403. The process is repeated until all the blocks of the last component are processed, test T3.

The process can be repeated for all the images forming the video sequence.

Figure 7:
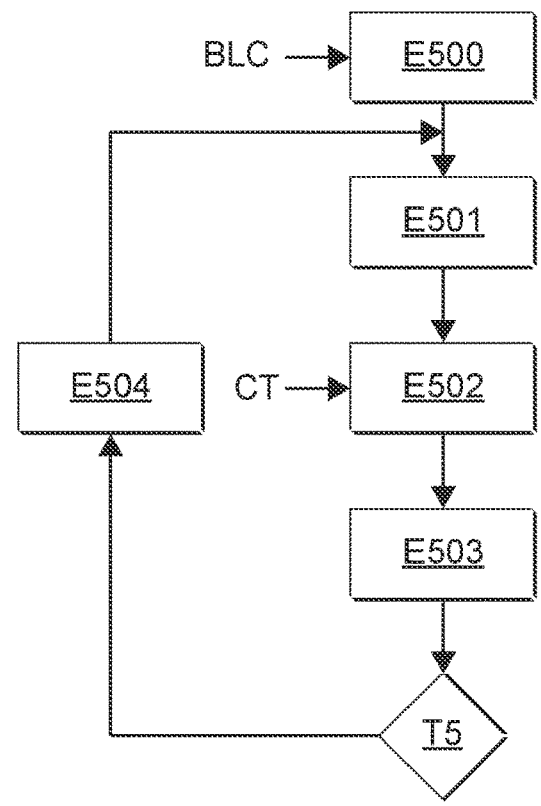
FIG. 7 shows a fifth embodiment of an encoding method according to the invention.

FIG. 7 illustrates another embodiment for encoding several components of a block of the image. The encoding is herein made block by block. All the components of a same block are encoded before encoding the next block. For this embodiment, the components have preferably the same block partitioning.

During a step E500, a first block is obtained (for example, located at the top left of the image). The block processing order is here supposed to be known. The luminance component of this block is encoded at step E501. Then, the first chrominance component of this block is encoded at step E502, according to one of the methods described hereinabove, potentially as a function of a criterion CT.

The second chrominance component is encoded at step E503 according to one of the methods described hereinabove, potentially as a function of a criterion CT. As an alternative, the encoding mode used for the first chrominance component of the block is used by default for encoding the second chrominance component of the block.

If the processed block is not the last one, test T5, the next block is considered. The process is reiterated until the last block.

As an alternative, given that the chrominance components and the luminance component have the same partitioning, the block chrominances can be encoded using the mode selected for encoding the block luminance. For example, if the mode selected for encoding the block luminance component is the BDPCM mode, this one is automatically used for encoding the block chrominance components.

As an alternative, at least two components of the considered block are encoded in parallel.

The process can be repeated for all the images forming the video sequence.

The encoding according to the embodiments of FIGS. 6 and 7 can notably comprise, for each image or for the whole video sequence, the encoding of information indicating whether the criterion CT is met or not. This information could be an indicator of the color format of the image or of the (all the) images of the video sequence. For example, the indicator can signal that the input image is in format 4:2:0 (criterion CT not met) or in format 4:4:4 (criterion CT met).

As an alternative, the embodiments of FIGS. 6 and 7 can comprise, for at least one image, encoding first information, indicating that the BDPCM mode can be used for encoding at least one block of at least one component of the image. And if the first information indicates that the BDPCM mode can be used for encoding at least one block of at least one component of the image, encoding second information relating to at least said image, indicating that the BDPCM mode can be used for encoding at least one block of the chrominance component of the image.

The first and second information can relate to each image of a video sequence for a better dynamics, or to the entire video sequence.

If the second information is activated, indicating that the BDPCM mode can be used on at least one block of the chrominance component, an indicator can be encoded for the block in question. This indicator, when activated, signals that the BDPCM mode is used for the block in question.

Figure 10:
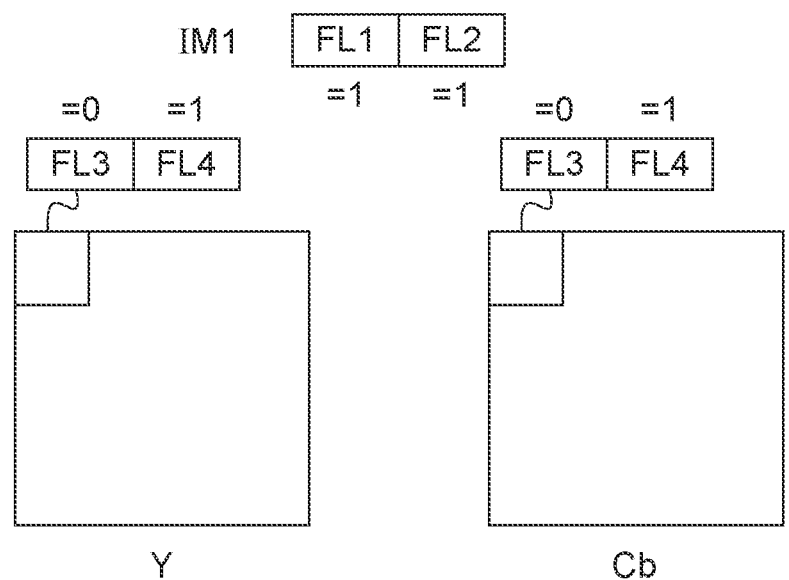
FIG. 10 illustrates an exemplary implementation of a step of an embodiment of an encoding/decoding method according to the invention.
Figure 10:
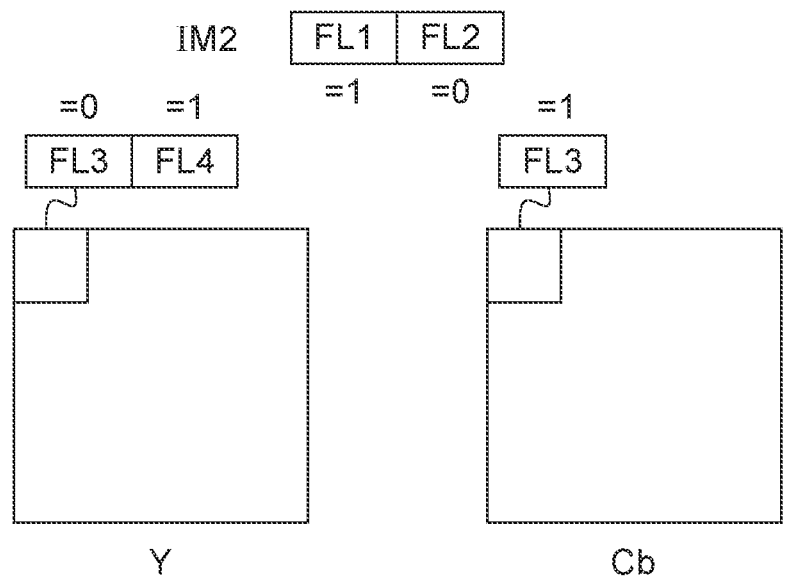

FIG. 10 illustrates an exemplary embodiment of this first and second information at the image level. Four indicators FL1, FL2, FL3 and FL4 are considered here. When indicator FL1 is activated (=1), in this case, the BDPCM mode can be used for at least one component of the image. When indicator FL2 is activated (=1), in this case, the BDPCM mode can be used for at least one block of a chrominance component of the image. If indicator FL2 is activated, for at least one block of the chrominance component, an indicator FL4 signals (=1) or not (=0) that the BDPCM mode is used for encoding the block in question. Another indicator, FL3, can be used for signalling the use of another encoding mode. As an alternative, the other encoding mode can be a default mode. In this case, no indicator is used.

For example, for a first image IM1, indicators FL1 and FL2 are both activated. Indicators FL3 and FL4 for one block of the luminance component Y of this image IM1 can then take respectively the values 0 and 1 indicating that the BDPCM mode is used for encoding the concerned block. Indicators FL3 and FL4 for a block of the chrominance component, here Cb, of this image IM1 can take the values "0" and "1", respectively, indicating that the BDPCM mode is used for encoding the concerned block.

In another example, for an image IM2, only indicator FL1 is activated. Indicator FL2 is deactivated. Indicators FL3 and FL4 for one block of the luminance component Y of this image IM1 can then take the values 0 and 1, respectively, indicating that the BDPCM mode is used for encoding the concerned block. Only an indicator FL3 is encoded for the block of the chrominance component, here Cb, of the image IM2, because indicator FL2 does not allow the use of the BDPCM mode for encoding a block of the chrominance component. Indicator FL3 is activated, signalling that the INTRA mode is used for encoding this block. If deactivated, another encoding mode could be used (for example, the INTER mode). As an alternative, no indicator is encoded for this block of the chrominance component. The encoding mode is a default mode.

The use of indicators FL1 and FL2 makes it possible to avoid encoding (then decoding) an indicator for each block of the luminance and/or the chrominance, when the BDPCM mode is not used in the image.

Reference is again made to FIGS. 6 and 7. The encoding according to the embodiments of these figures can comprise, for each image or for the whole video sequence, encoding information indicating whether the partitioning of the components is identical or not for the luminance and the chrominances. This indicator can signal a first partitioning for the luminance component and a second partitioning for the two chrominance components.

Moreover, the encoding of the blocks according to the embodiments of FIGS. 6 and 7 can comprise, if the BDPCM mode is selected for a component, encoding an encoding direction (vertical or horizontal). This direction can be encoded for the luminance block and a single chrominance component. The direction encoded for the block of the chrominance component is by default valid for the corresponding block of the second chrominance component.

The encoding according to the embodiments of FIGS. 6 and 7 can further comprise encoding first information relating to the image, adapted to indicate if the BDPCM mode can be used for encoding at least one component of at least one block of the image, and if the first information indicates that the BDPCM mode can be used for encoding at least one component of at least one block of the image, encoding second information relating to said image, adapted to indicate that the BDPCM mode can be used for encoding the chrominance component of at least one block of the image.

As an alternative, this information can comprise a first indicator indicating the mode used for the block of the luminance component and a second indicator indicating the mode used for the block of the chrominance component.

As an alternative, this information can comprise a single indicator indicating the mode used for the block of the luminance component and the mode used for the block of the chrominance component(s).

As an alternative, this information can comprise a first indicator indicating the mode used for the block of the luminance component and a single second indicator indicating the mode used for the block of both chrominance components.

Figure 8:
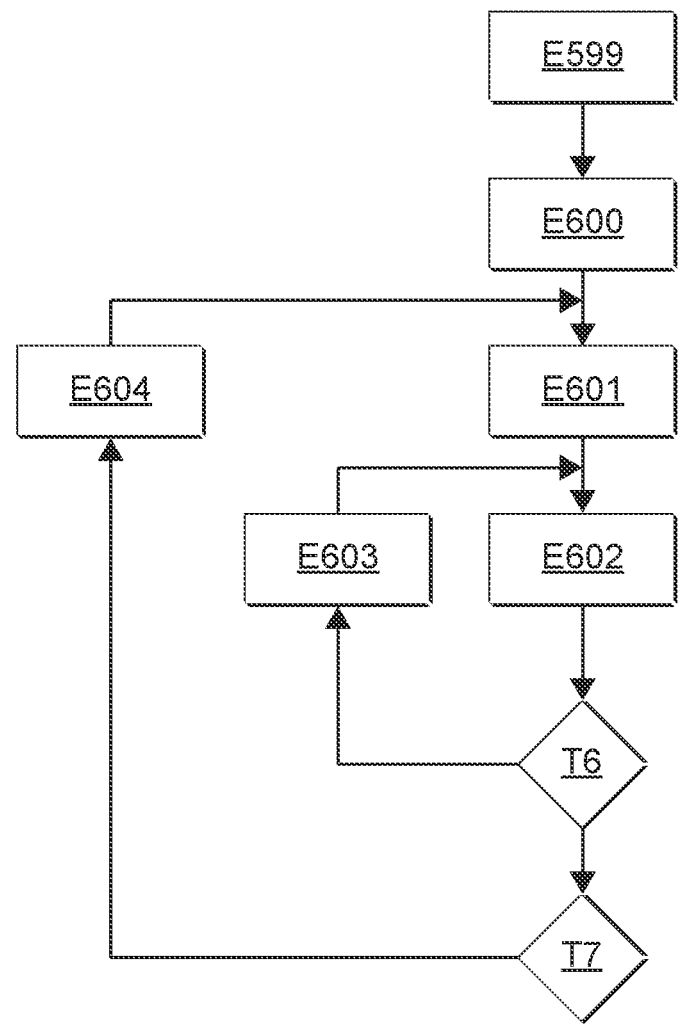
FIG. 8 shows a first embodiment of a decoding method according to the invention.
Figure 9:
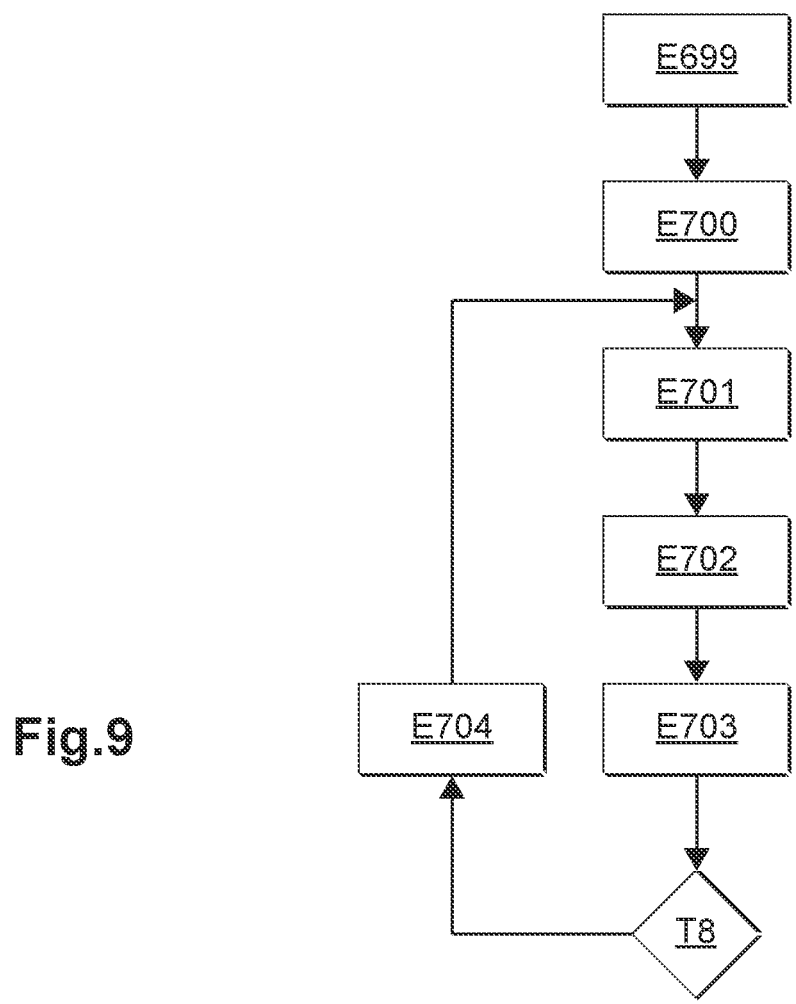
FIG. 9 shows a second embodiment of a decoding method according to the invention.

FIGS. 8 and 9 illustrate two embodiments of a method for decoding a stream of encoded data representative of the image(s) of a video sequence according to the invention. These figures correspond to the embodiments of FIGS. 6 and 7, respectively.

First, reference will be made to FIG. 8, in which decoding is made component by component. The embodiment can previously comprise a step E599 of decoding first encoded information, relating to the image (or to the video sequence) to which the component belongs, indicating whether the BDPCM mode is used or not for encoding at least one component of at least one block of the image. This first information corresponds to indicator FL1 of FIG. 10.

If the first information, once decoded, indicates that the BDPCM mode can be used for encoding at least one component of at least one block of the image, a second information relating to said image is decoded. This second information corresponds to indicator FL2 of FIG. 10 indicates that the BDPCM mode has been used for encoding the chrominance component of at least one block of the image.

As an alternative, the previous step E599 can include decoding information representative of a predetermined criterion, for example the color format of the considered image (or of all the images of the video sequence). As a function of the color format obtained, the BDPCM mode can have been used or not for encoding a chrominance component of a block, and a corresponding information can be decoded for the block of this chrominance component.

After this previous step E599 (which may be optional), the decoding is here made component by component. All the blocks of a same component are decoded before decoding the blocks of another component.

In a first step E600, the encoded data representative of a first component, for example the luminance component, are considered. Then, for this luminance component, the encoded data of the first block in the decoding order are considered, at step E601. During a step E602, information (for example, indicators FL3, FL4 in FIG. 10) can be decoded, indicating for this block of the luminance component whether it is encoded using a BDPCM mode or another mode.

As a function of the value of the information, the luminance component block is decoded with one mode or the other one. During a test T6, it is checked that the decoded block is not the last of the processed component. If this is not the case, the process continues with the next block, at step E603, until all the blocks of the luminance component are decoded.

If the processed component is not the last one, test T7, the encoded data of another component, for example the first chrominance component, are obtained at step E604. Likewise, the encoded data relating to the first block of the new component are selected at step E601. Information representative of the encoding mode used for the block of the considered chrominance component can be decoded (for example, an indicator FL3 or indicators FL3, FL4 of FIG. 10). If allowed by the second information decoded at step E599, this information representative of the encoding mode can signal the BDPCM mode. If not allowed by the second information decoded at step E599, this information representative of the encoding mode can signal another mode, as explained with reference to FIG. 10.

As an alternative, if not allowed by the second information decoded at step E599, the encoding mode used can be a mode by default, for example the INTRA mode.

As an alternative, if the chrominance component and the luminance component have the same partitioning, the chrominance block can be decoded using the mode that has been used for encoding the corresponding block of the luminance component.

As previously, if the processed block of the chrominance component is not the last one, test T6, the process continues with the next block E603. The process is repeated until all the blocks of the last component are processed, test T7.

The process is herein repeated in such a way that all the encoded data of the video data stream are processed.

FIG. 9 illustrates another embodiment for decoding several components of a block of the image. The decoding is herein made block by block. All the components of a same block are decoded before decoding the next block. For this embodiment, the components have preferably the same partitioning.

As for the embodiment shown in FIG. 8, the method can comprise a previous step E699, similar to the above-mentioned step E599.

After this previous step E699 (which may be optional), the encoded data corresponding to a first block are obtained, E700. The block processing order is here supposed to be known. Information indicative of the encoding mode that has been used for encoding the luminance component is decoded (for example, FL3, FL4). The luminance component of this block is decoded at step E701 from this decoded encoding mode information.

Then, information indicative of the encoding mode that has been used for encoding the chrominance component of the concerned block is decoded (for example, FL3, FL4, or only FL3).

As an alternative, the information decoded during the decoding of the luminance component can also indicate the encoding mode of the chrominance component of the considered block, if it is for example encoded on two bits or by being a mode by default for all the components of the concerned block.

The first chrominance component of this block is now decoded at step E702 using the mode indicated by the decoded information, wherein this mode can be the BDPCM mode.

The second chrominance component is decoded at step E703 according to one of the methods described hereinabove. As an alternative, the encoding mode used for the first chrominance component of the block is automatically used for decoding the second chrominance component of the block.

If the processed block is not the last one, test T5, the next block is considered. The process is reiterated until the last block.

As an alternative, at least two components of the considered block are decoded in parallel. The process is here repeated in such a way that all the encoded data of the video data stream are processed.

Figure 11:
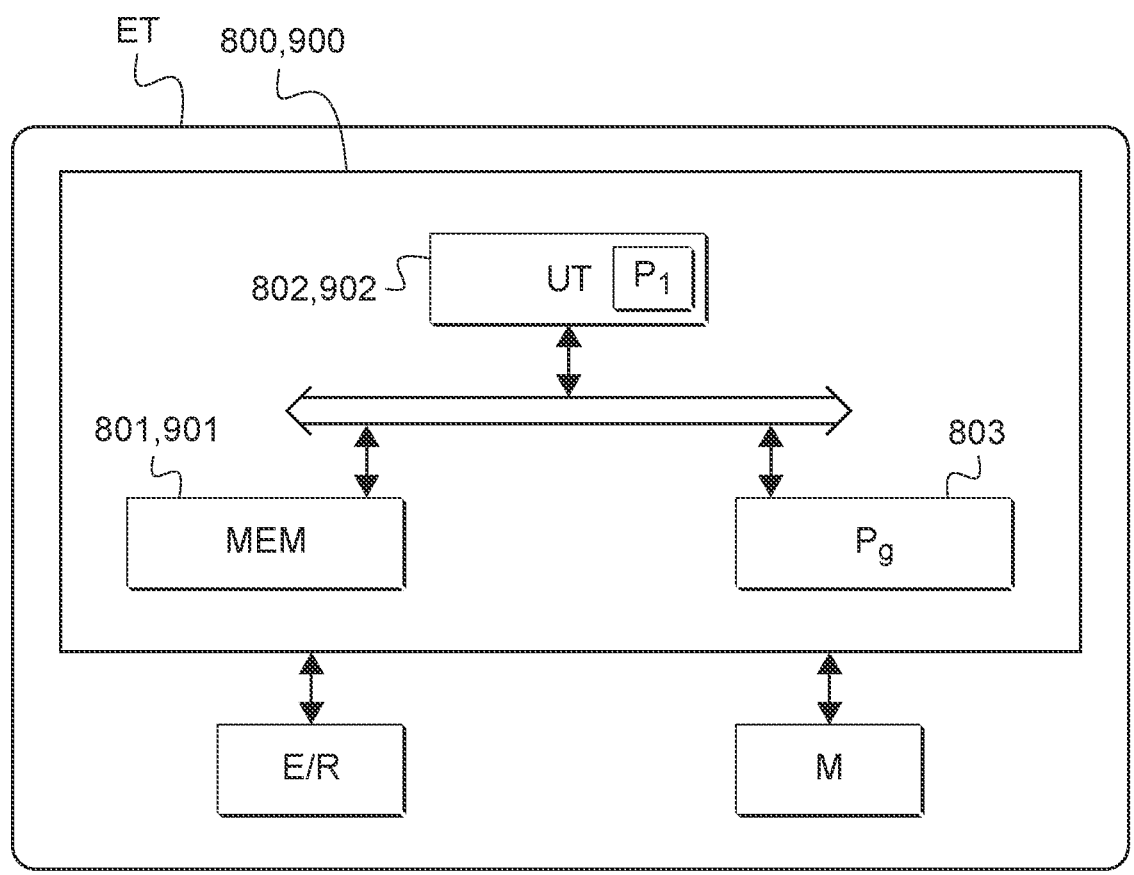
FIG. 11 schematically illustrates an embodiment of a device according to the invention.

According to a particular embodiment of the invention illustrated by FIG. 11, the steps of the encoding method are implemented by computer program instructions. For that purpose, the encoding device 800 or the decoding device 900 has the conventional architecture of a computer and comprises in particular a memory MEM 801, 901, a processing unit UT 802, 902, equipped for example with at least one microprocessor P1, and piloted by the computer program Pg 803 stored in the memory MEM. The computer program Pg comprises instructions for implementing the steps of the encoding or decoding method as described hereinabove, when the program is executed by the microprocessor.

At initialization, the code instructions of the computer program Pg are for example loaded in a RAM before being executed by the processor. The processor of the processing unit UT implements in particular the steps of the encoding or decoding method described hereinabove in these different alternatives, according to the instructions of the computer program Pg.

The device 800, 900 can be arranged in such a way as to cooperate with at least the following modules of a terminal ET:
- a data transmission/reception module E/R, by means of which a binary stream or a compressed file FC is transmitted in a telecommunication network, for example a wire network or a hertzian network; and
- a module M for storing the image or the sequence of images to be encoded, the obtained encoded data stream/file or the decoded image or sequence of images.

According to an embodiment, the device 800 for encoding an image of a video sequence, the image comprising at least two components, including a component representative of the luminance and a component representative of the chrominance, each component being partitioned into blocks, comprises at least one microprocessor configured to implement an encoding of at least one block of the chrominance component, using a so-called BDPCM mode.

According to an embodiment, the device 800 for encoding an image of a video sequence, the image comprising at least two components, including a component representative of the luminance and a component representative of the chrominance, each component being partitioned into blocks, comprises at least one microprocessor configured to implement, for at least one block of the chrominance component, the steps of evaluating a so-called BDPCM mode and of another mode for encoding said block and, as a function of the evaluation outcome, selecting one of the modes for encoding said block, and encoding information representative of the mode selected for encoding said block.

According to an embodiment, the device 900 for decoding an encoded encoded from a stream of encoded video data, the image comprising at least two components, including a component representative of the luminance and a component representative of the chrominance, each component being partitioned into blocks, wherein the device comprises at least one microprocessor configured to implement a step of decoding information indicating, for at least one block of the chrominance component, whether it is encoded or not using a so-called BDPCM mode.

Of course, various other changes can be made to the invention within the scope of the appended claims.

The invention claimed is:

1. A method for encoding an image of a video sequence, the image comprising at least a luminance component, a first chrominance component, and a second chrominance component, each of the luminance component, the first chrominance component, and the second chrominance component being partitioned into blocks, the second chrominance component having the same partitioning as the first chrominance component, the method comprising:
   encoding at least one said of the blocks of the first chrominance component, using a Block Differential Pulse Code Modulation (BDPCM) mode, the encoding comprising encoding information indicative of the BDPCM mode used to encode the at least one block of the first chrominance component and a corresponding one of the blocks of the second chrominance component.

2. The method according to claim 1, wherein the encoding of the at least one said block of the first chrominance component is performed using the BDPCM mode when a predetermined criterion is met.

3. The method according to claim 2, wherein the criterion is an encoding criterion indicative of a choice made by an encoder configured to implement said encoding method.

4. The method according to claim 3, wherein the choice made by the encoder results from an analysis of the video sequence.

5. The encoding method according to claim 1, wherein each of the blocks comprises elements each having a value, each encoding of a specific one of the blocks using the BDPCM mode comprising, for at least one of the elements of the specific block, encoding a quantized value of a residual representing a difference between a first value and a second value,
   wherein the first value for specific one of the said elements is a quantized value of a difference between the value of the specific element and a reference element whose position is determined based on a direction, and wherein the second value is a quantized value of a difference between the value of another of the elements and another reference element whose position is determined based on said direction.

6. A method of decoding an encoded image, from a stream of encoded video data, the encoded image including at least a luminance component, at least a first chrominance component, and a second chrominance component, each of the luminance and chrominance components being partitioned into blocks, the second chrominance component having the same partitioning as the first chrominance component, the method comprising:
    decoding information indicating, for at least one of the blocks of the first chrominance component, whether the at least one block is encoded or not using a Block Differential Pulse Code Modulation (BDPCM) mode, a value decoded from the information being used to indicate whether a corresponding one of the blocks of the second chrominance component is encoded using the BDPCM mode.

7. The method according to claim 6, wherein said value decoded from said information also indicates a direction allowing, from respective block predictors, as a function of said direction, decoding the at least one block of said first chrominance component and the corresponding block of the second chrominance component.

8. A method of decoding an encoded image, from a stream of encoded video data, the image comprising at least a luminance component, at least a first chrominance component, and a second chrominance component, each of the luminance component, the first chrominance component, and the second chrominance component being partitioned into blocks, the second chrominance component having the same partitioning as the first chrominance component, the method comprising:
    decoding first information representative of an encoding criterion; and
    when a value decoded from the first information indicates that the encoding criterion is met, decoding second information indicating, for at least one said of the blocks of the first chrominance component, whether the at least one block of the first chrominance component is encoded or not using a Block Differential Pulse Code Modulation (BDPCM) mode, a value decoded from the second information being used to indicate whether a corresponding one of the blocks of the second chrominance component is encoded using the BDPCM mode.

9. The method according to claim 8, wherein said value decoded from the second information also indicates a direction allowing, from respective block predictors, as a function of said direction, decoding the block of the first chrominance component and the corresponding said block of the second chrominance component.

10. The method according to claim 8, further comprising decoding another information indicating, for at least one said block of the second chrominance component, whether said block of the second chrominance component is encoded using the BDPCM mode.

11. The method according to claim 8, wherein the encoding criterion is indicative of a choice made by an encoder having encoded said video data stream.

12. The method according to claim 11, wherein the choice made by the encoder results from an analysis of the video data stream.

13. A method of decoding an encoded image, from a stream of encoded video data, the encoded image including at least a luminance component and a chrominance component, each of the luminance and chrominance components being partitioned into blocks, the method comprising:
    decoding first information relating to at least said image, indicating whether a Block Differential Pulse Code Modulation (BDPCM) mode is able to be used to decode at least one of the blocks of at least one of the components of the image; and
    when the first information indicates that the BDPCM mode is able to be used to decode the at least one block of at least one of the components of the image, decoding second information relating to at least said image, indicating whether the BDPCM mode is able to be used to decode at least one block of the chrominance component of the image.

14. The method according to claim 13, further comprising, when the second information relating to said image indicates that the BDPCM mode is able to be used to decode the at least one block of the first chrominance component of the image, decoding an indicator relating to the at least one block of the first chrominance component, indicating whether the BDPCM mode is used to decode said at least one block of the first chrominance component.

15. A method of decoding an encoded image, from a stream of encoded video data, the image including at least a luminance component and a chrominance component, each of the luminance and chrominance components being partitioned into blocks, the luminance and chrominance components having the same block partitioning, the method comprising:
    decoding first information representative of an encoding criterion; and
    when a value decoded from the first information indicates that the encoding criterion is met, decoding second information relative to at least one said of the blocks of the luminance component indicating whether the at least one block of the luminance component and a corresponding at least one of the blocks of the chrominance component are encoded or not using a Block Differential Pulse Code Modulation (BDPCM) mode.

16. A device of encoding an image of a video sequence, the image including at least at least a luminance component, first chrominance component, and second chrominance component, each of the luminance component, the first chrominance component, and the second chrominance component being partitioned into blocks, the second chrominance component having the same partitioning as the first chrominance component, the device comprising:
    at least one microprocessor configured to implement encoding at least one of the blocks of the first chrominance component, using a Block Differential Pulse Code Modulation (BDPCM) mode and encoding information indicative of the BDPCM mode used to encode the at least one block of the first chrominance component and a corresponding block of the second chrominance component.

17. A device configured to decode an encoded image from a stream of encoded video data, the image including at least a luminance component, a first chrominance component, and a second chrominance component, each of the luminance component, the first chrominance component, and the second chrominance component being partitioned into blocks, the second chrominance component having the same partitioning as the first chrominance component, the device comprising:
    at least one microprocessor configured to implement decoding information indicating, for at least one of the blocks of the first chrominance component, whether the at least one block and a corresponding block of the second chrominance component is encoded or not using a Block Differential Pulse Code Modulation (BDPCM) mode.

* * * * *